(12) United States Patent
Kuwahata et al.

(10) Patent No.: US 10,274,068 B2
(45) Date of Patent: Apr. 30, 2019

(54) SPRING ASSEMBLY AND LOCK-UP DEVICE FOR TORQUE CONVERTER INCLUDING SAME

(71) Applicant: EXEDY Corporation, Neyagawa-shi, Osaka (JP)

(72) Inventors: Mitsuru Kuwahata, Neyagawa (JP); Masahiro Maeda, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 64 days.

(21) Appl. No.: 15/435,644

(22) Filed: Feb. 17, 2017

(65) Prior Publication Data

US 2017/0276221 A1  Sep. 28, 2017

(30) Foreign Application Priority Data

Mar. 25, 2016  (JP) .................................. 2016-061215

(51) Int. Cl.
*F16H 45/02* (2006.01)
*F16F 15/121* (2006.01)
*F16F 15/123* (2006.01)

(52) U.S. Cl.
CPC ......... *F16H 45/02* (2013.01); *F16F 15/1216* (2013.01); *F16F 15/12346* (2013.01); *F16F 2232/02* (2013.01); *F16F 2236/08* (2013.01); *F16H 2045/0205* (2013.01); *F16H 2045/0221* (2013.01); *F16H 2045/0226* (2013.01); *F16H 2045/0278* (2013.01)

(58) Field of Classification Search
CPC .............. F16H 45/02; F16H 2045/0221; F16F 15/1216; F16F 2232/02; F16F 2236/08
See application file for complete search history.

(56) References Cited

U.S. PATENT DOCUMENTS

| | | | | |
|---|---|---|---|---|
| 3,711,917 A | * | 1/1973 | Baumgras | B21F 3/00 148/537 |
| 5,310,167 A | * | 5/1994 | Noll, Jr. | F16F 1/024 267/166 |
| 5,682,972 A | * | 11/1997 | Sasada | F16F 15/12346 192/213 |
| 5,915,511 A | * | 6/1999 | Yamaguchi | F16H 45/02 192/213.1 |
| 6,269,923 B1 | * | 8/2001 | Yamashita | F16H 45/02 192/213 |
| 9,746,035 B2 | * | 8/2017 | Hennebelle | F16F 15/12373 |
| 9,945,444 B2 | * | 4/2018 | Tomiyama | F16F 15/1338 |
| 2007/0240472 A1 | * | 10/2007 | Wack | F16F 1/04 72/132 |

(Continued)

FOREIGN PATENT DOCUMENTS

JP  2004183871 A  7/2004

*Primary Examiner* — David J Hlavka
(74) *Attorney, Agent, or Firm* — United IP Counselors, LLC

(57) ABSTRACT

A spring assembly for absorbing and attenuating a torsional vibration includes an outer coil spring and an inner coil spring. The inner coil spring is disposed in an interior of the outer coil spring. The inner coil spring has a shorter free length than the outer coil spring. The inner coil spring is chamfered on end surfaces of both ends thereof. The inner coil spring has an outer diameter set to be smaller at least at an endmost winding on each of the ends thereof than at other windings thereof.

5 Claims, 4 Drawing Sheets

(56) References Cited

U.S. PATENT DOCUMENTS

2016/0061306 A1* 3/2016 Kawahara ......... F16F 15/12373
60/338
2017/0227084 A1* 8/2017 Ditzel .................... F16F 7/108

\* cited by examiner

SPRING ASSEMBLY AND LOCK-UP DEVICE FOR TORQUE CONVERTER INCLUDING SAME

CROSS-REFERENCE TO RELATED APPLICATIONS

This application claims priority to Japanese Patent Application No. 2016-061215 filed on Mar. 25, 2016, the entirety of which is hereby incorporated by reference in its entirety.

BACKGROUND

Technical Field

The present disclosure relates to a spring assembly, particularly to a spring assembly for absorbing and attenuating torsional vibration and a damper mechanism.

Background Information

In vehicles, spring assemblies are installed in a damper mechanism for, e.g., a clutch disc assembly, a flywheel assembly, a lock-up clutch for a torque converter, etc., so as to absorb and attenuate torsional vibration. The spring assemblies are disposed to elastically couple an input-side rotary member and an output-side rotary member in a circumferential direction. When the input-side rotary member and the output-side rotary member are rotated relatively to each other, the spring assemblies are configured to be compressed therebetween in a rotational direction. Additionally, torsional vibration inputted into the input-side rotary member is absorbed and attenuated by using the spring assemblies described above and a friction resistance portion configured to generate friction resistance in the relative rotation.

As a type of spring assembly described above, there has been known a spring assembly using so-called "nested springs" composed of two coil springs with one being nested in the other (see Japan Laid-open Patent Application Publication No. 2004-183871). The spring assembly using the nested springs includes an outer coil spring and an inner coil spring disposed in the interior of the outer coil spring. When both coil springs are compressed, this spring assembly exerts higher stiffness and generates larger load than a type of spring assembly using a single coil spring.

Japan Laid-open Patent Application Publication No. 2004-183871 describes that in each spring assembly using the nested springs, the free length of the inner coil spring is set to be shorter than that of the outer coil spring, whereby the inner coil spring is movable in a rotational direction in the interior of the outer coil spring.

In this construction, when compressed by torsional vibration, the inner coil spring is moved to the outer peripheral side by a centrifugal force, and slides against the inner peripheral surface of the outer coil spring. At this time, the inner peripheral surface of the outer coil spring is inevitably abraded by the sliding of the inner coil spring. Additionally, when both ends of the inner coil spring get stuck between windings of the outer coil spring by the sliding of the inner coil spring, chances are that flashes are formed at three consecutive windings including the endmost winding on each of the ends of the inner coil spring due to friction with the windings of the outer coil spring, and intrude as foreign objects into the slide part between the inner coil spring and the outer coil spring and so forth.

BRIEF SUMMARY

It is an object of the present disclosure to inhibit both ends of an inner coil spring from getting stuck between windings of an outer coil spring so as to prevent formation of flashes at three consecutive windings including the endmost winding on each of the ends of the inner coil spring and inhibit abrasion of the inner peripheral surface of the outer coil spring attributed to sliding of the inner coil spring.

A spring assembly according to an aspect of the present disclosure is a spring assembly for absorbing and attenuating a torsional vibration. The spring assembly includes an outer coil spring and an inner coil spring disposed in an interior of the outer coil spring. The inner coil spring has a shorter free length than the outer coil spring. The inner coil spring is chamfered on end surfaces of both ends thereof. The inner coil spring has an outer diameter set to be smaller at least at an endmost winding on each of the ends thereof than at other windings thereof.

With this construction, both ends of the inner coil spring are unlikely to get stuck between windings of the outer coil spring, and formation of flashes can be inhibited at three consecutive windings, including the endmost winding, on each of the ends of the inner coil spring.

The inner coil spring may have a lower surface hardness than the outer coil spring. In this spring assembly, it is possible to inhibit abrasion of the inner peripheral surface of the outer coil spring attributed to sliding of the inner coil spring as much as possible.

A spring assembly according to another aspect of the present disclosure is a spring assembly for absorbing and attenuating a torsional vibration. The spring assembly includes an outer coil spring and an inner coil spring disposed in an interior of the outer coil spring. The inner coil spring has a lower surface hardness than the outer coil spring. With this construction, it is possible to inhibit abrasion of the inner peripheral surface of the outer coil spring attributed to sliding of the inner coil spring.

The outer diameter of the inner coil spring may get smaller the each of the ends at a plurality of windings on each of the ends. With this construction, it is possible to further reliably inhibit the aforementioned stuck condition and abrasion.

A lock-up device for a torque converter according to yet another aspect of the present disclosure is configured to transmit a power from a front cover to an input shaft of a transmission through a torque converter body including a turbine. The lock-up device includes an input rotary member, an output rotary member, a clutch portion and the aforementioned spring assembly. The input rotary member is a member into which the power is configured to be inputted from the front cover. The output rotary member is coupled to the turbine. The clutch portion is mounted between the input rotary member and the output rotary member. The spring assembly elastically couples the input rotary member and the output rotary member in a rotational direction.

Overall, according to the present disclosure described above, it is possible to inhibit both ends of the inner coil spring from getting stuck between windings of the outer coil spring, prevent formation of flashes at three consecutive windings including the endmost winding on each of both ends of the inner coil spring, and further, inhibit abrasion of the inner peripheral surface of the outer coil spring attributed to sliding of the inner coil spring.

BRIEF DESCRIPTION OF THE DRAWINGS

Referring now to the attached drawings which form a part of this original disclosure.

DETAILED DESCRIPTION OF EMBODIMENTS

First Preferred Embodiment

Construction of Torque Converter

Figure 1:
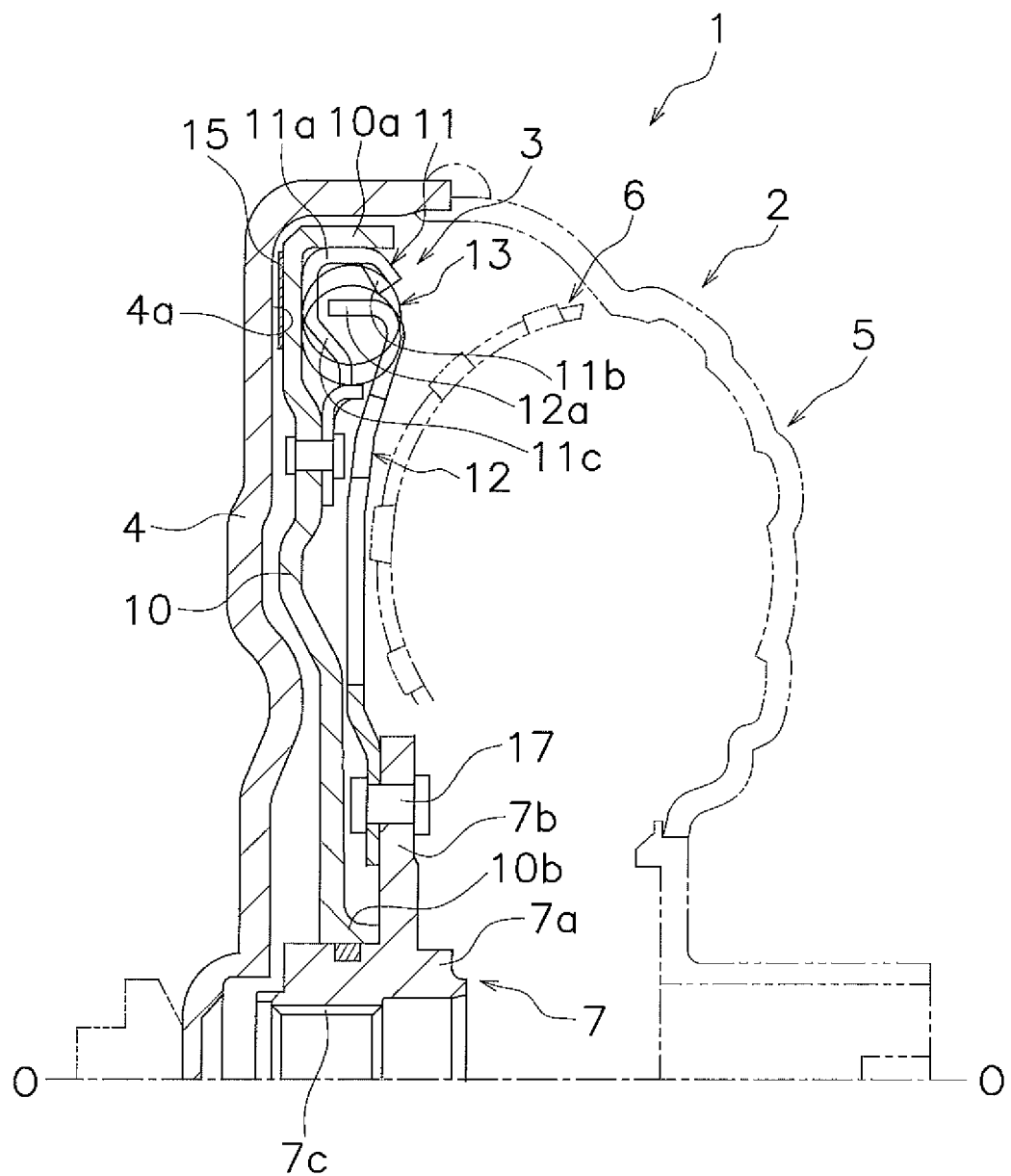
FIG. 1 is a schematic vertical cross-sectional view of a torque converter employing a preferred embodiment of the present disclosure.

A spring assembly according to a preferred embodiment of the present disclosure will be explained based on the attached diagrams. FIG. 1 shows a schematic vertical cross-sectional view of a torque converter 1 including spring assemblies according to the preferred embodiment of the present disclosure. In FIG. 1, an engine (not shown in the drawing) is disposed on the left side whereas a transmission (not shown in the drawing) is disposed on the right side. In FIG. 1, line O-O indicates a rotational axis of the torque converter 1.

The torque converter 1 includes a torque converter body 2 and a lock-up device 3. The torque converter body 2 is mainly composed of a front cover 4, an impeller 5, a turbine 6 and so forth. The torque converter body 2 is constructed similarly to a well-known torque converter body, and therefore will be briefly explained.

The front cover 4 is a disc member coupled to a crankshaft of the engine. The front cover 4 defines a hydraulic oil chamber of the torque converter 1 together with the impeller 5. The turbine 6 is disposed in the hydraulic oil chamber and is opposed to the impeller 5 in an axial direction. The turbine 6 is coupled at its inner peripheral part to a turbine hub 7 to be described. The turbine hub 7 is coupled to a main drive shaft (not shown in the drawings) of the transmission.

The turbine hub 7 is a cylindrical member. The turbine hub 7 is composed of a boss 7a and a flange 7b. The boss 7a has a tubular shape. The flange 7b has a disc shape and is provided on the outer peripheral surface of the boss 7a. The boss 7a is provided with a spline 7c on its inner peripheral surface. The spline 7c is spline-coupled to the main drive shaft of the transmission.

Construction of Lock-up Device

The lock-up device 3 will be herein explained using FIG. 1. The lock-up device 3 is a device configured to mechanically transmit a torque from the front cover 4 to the turbine 6 and absorb and attenuate torsional vibration inputted therein. In other words, the lock-up device 3 has both of a clutch function and a damper function. As shown in FIG. 1, the lock-up device 3 is disposed in a space between the front cover 4 and the turbine 6. The lock-up device 3 is mainly composed of a piston 10 (clutch portion), a drive plate 11 (input rotary member), a driven plate 12 (output rotary member), and a plurality of spring assemblies 13.

The piston 10 is disposed to axially divide the space between the front cover 4 and the turbine 6. The piston 10 is an annular disc member and is movable in the axial direction by variation in hydraulic pressure within the torque converter 1. A friction facing 15 is fixed to the front cover 4-side lateral surface of the piston 10. The friction facing 15 has an annular shape.

The friction facing 15 is fixed to the outer peripheral part of the piston 10, and is opposed to a friction surface 4a of the front cover 4. The friction surface 4a has an annular and flat shape.

The piston 10 is provided with an outer peripheral tubular part 10a on its outer peripheral part. The outer peripheral tubular part 10a extends axially toward the transmission. Additionally, the piston 10 is provided with an inner peripheral tubular part 10b on its inner peripheral edge. The inner peripheral tubular part 10b extends axially toward the transmission. With the construction, the piston 10 is movable with respect to the turbine hub 7 in both of the axial and rotational directions.

The drive plate 11 is fixed to the piston 10, and holds the spring assemblies 13. Simultaneously, the drive plate 11 functions as an input member configured to input a torque into the spring assemblies 13. The drive plate 11 is an annular plate member and is disposed on the axial transmission side of the outer peripheral part of the piston 10. The drive plate 11 includes a holder part 11a for holding the plurality of spring assemblies 13 aligned in a circumferential direction from their outer peripheral side. The holder part 11a makes contact with the inner peripheral side of the outer peripheral tubular part 10a of the piston 10. Moreover, the drive plate 11 includes support parts 11b and 11c for supporting both circumferential ends of the respective spring assemblies 13. The support parts 11b are formed by cutting part of the holder part 11a and bending them radially inside. The support parts 11c are formed by cutting part of a disc-shaped part of the drive plate 11 and raising them axially toward the transmission.

The driven plate 12 is a member to which a torque is outputted from the spring assemblies 13. The driven plate 12 is an annular disc member and is disposed axially between the turbine 6 and the piston 10. The inner peripheral part of the driven plate 12 is fixed to the flange 7b of the turbine hub 7 by a plurality of rivets 17 aligned in the circumferential direction. The driven plate 12 is provided with a plurality of spring support pawls 12a on its outer peripheral edge. The spring support pawls 12a make contact with both ends of the respective spring assemblies 13.

Construction of Spring Assemblies

Figure 2:
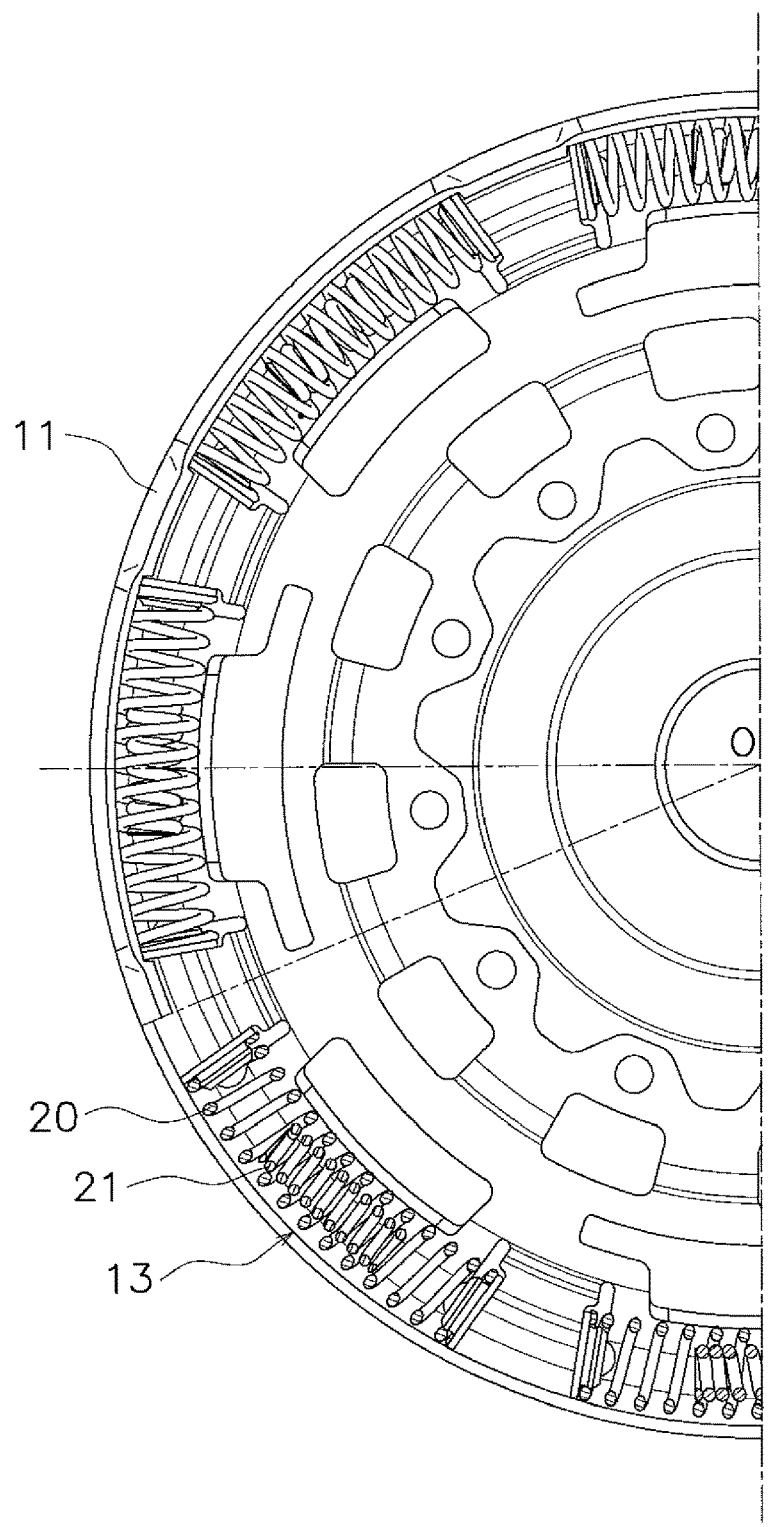
FIG. 2 is a partial plan view of a lock-up device.
Figure 3:
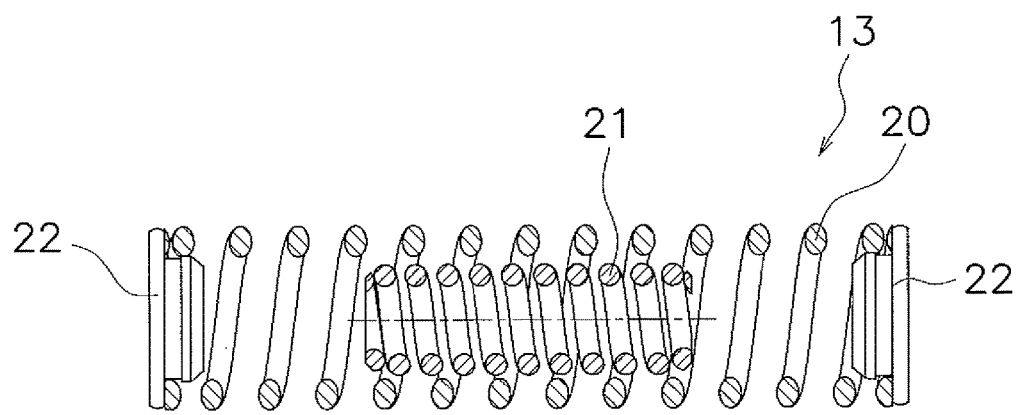
FIG. 3 is a cross-sectional view of a spring assembly according to a first preferred embodiment of the present disclosure.

As shown in FIGS. 2 and 3, each spring assembly 13 includes an outer coil spring 20, an inner coil spring 21, and a pair of spring seats 22. Both types of springs 20 and 21 function as elastic members between the drive plate 11 and the driven plate 12. A plurality of outer coil springs 20 are disposed on a radially outer region while being aligned at equal intervals in the circumferential direction.

Figure 4:
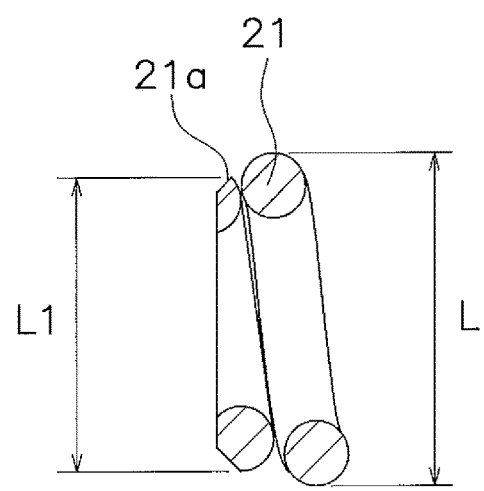
FIG. 4 is a partial enlarged view of FIG. 3.
Figure 5:
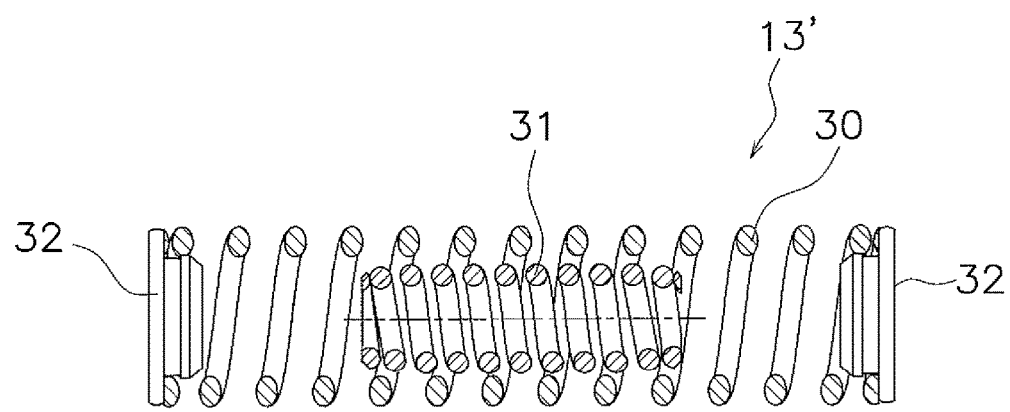
FIG. 5 is a cross-sectional view of a spring assembly according to a second preferred embodiment of the present disclosure.

Each inner coil spring 21 is disposed in the interior of each outer coil spring 20, and has a free length set to be shorter than that of each outer coil spring 20. As shown in a partial enlarged view of FIG. 4, each inner coil spring 21 is provided with chamfered parts 21a on its both end surfaces. The chamfered parts 21a are formed by machining. The first (endmost) winding on each end of each inner coil spring 21 has a diameter L1 that is smaller than an outer diameter L of the other windings. When in the free state, each inner coil spring 21 is movable within each outer coil spring 20 in the rotational direction. Each pair of spring seats 22 is disposed on both ends of each outer coil spring 20. It should be noted that a construction of disposing the spring seats 22 on both ends of each outer coil spring 20 is herein exemplified, but the spring seats 22 may not be provided.

Actuation of Spring Assemblies

When a lock-up state (clutch engaged state) is made in the torque converter 1, a torque from the engine is transmitted to the turbine hub 7 through the lock-up device 3. When fluctuation in torque is inputted from the engine side in this condition, the spring assemblies 13 are extended and compressed between the drive plate 11 and the driven plate 12 in the rotational direction. At this time, each inner coil spring 21 is moved to the outer peripheral side by a centrifugal force, and slides against the inner peripheral surface of each outer coil spring 20. However, in each inner coil spring 21, at least the first (endmost) winding on each of both ends has the outer diameter L1 that is smaller than the outer diameter L of the other windings. Hence, it is possible to inhibit both ends of each inner coil spring 21 from getting stuck between windings of each outer coil spring 20. Additionally, the chamfered parts 21a, formed on the end surfaces of both ends of each inner coil spring 21, can also inhibit both ends of each inner coil spring 21 from getting stuck between windings of each outer coil spring 20.

Second Preferred Embodiment

A second preferred embodiment will be hereinafter explained. Except for spring assemblies, constituent elements of a torque converter body according to the second preferred embodiment are the same as those of the torque converter body 2 according to the first preferred embodiment. Hence, in the second preferred embodiment, constituent elements, which are the same as those of the first preferred embodiment, will not be hereinafter explained. It should be noted that in the second preferred embodiment, each inner coil spring includes windings having an equal outer diameter, and hence, is not required to be chamfered unlike each inner coil spring 21 of the first preferred embodiment.

Each of the spring assemblies 13' includes an outer coil spring 30, an inner coil spring 31 and a pair of spring seats 32. A plurality of outer coil springs 30 are disposed on a radially outer region while being aligned at equal intervals in the circumferential direction. Each of a plurality of inner coil springs 31 is disposed in the interior of each outer coil spring 30, and has a free length set to be shorter than that of each outer coil spring 30. When in the free state, each inner coil spring 31 is movable within each outer coil spring 30 in the rotational direction. Each pair of spring seats 32 is disposed on both ends of each outer coil spring 30. It should be noted that a construction of disposing the spring seats 32 on both ends of each outer coil spring 30 is herein exemplified, but the spring seats 32 may not be provided.

Both types of coil springs 30 and 31 are herein processed with thermal treatment (e.g., carbonitriding) so as to make the surface hardness of each inner coil spring 31 lower than that of each outer coil spring 30. Accordingly, it is possible to inhibit abrasion of the inner peripheral surface of each outer coil spring 30 attributed to sliding of the inner coil spring 31.

Third Preferred Embodiment

A third preferred embodiment will be hereinafter explained. The construction of the torque converter body according to the third preferred embodiment is implemented by adding a characteristic feature of the second preferred embodiment (i.e., difference in hardness) to the spring assemblies of the first preferred embodiment. Except for the spring assemblies, constituent elements of the third preferred embodiment are the same as those of the first preferred embodiment. Hence, in the third preferred embodiment, constituent elements, which are the same as those of the first preferred embodiment, will not be hereinafter explained. By setting difference in surface hardness between each outer coil spring and each inner coil spring, in other words, by setting the surface hardness of each inner coil spring to be lower than that of each outer coil spring, it is possible to prevent abrasion of the inner peripheral surface of each outer coil spring and further inhibit the aforementioned slide related troubles including occurrence of a stuck condition and production of flashes.

Fourth Preferred Embodiment

Figure 6:
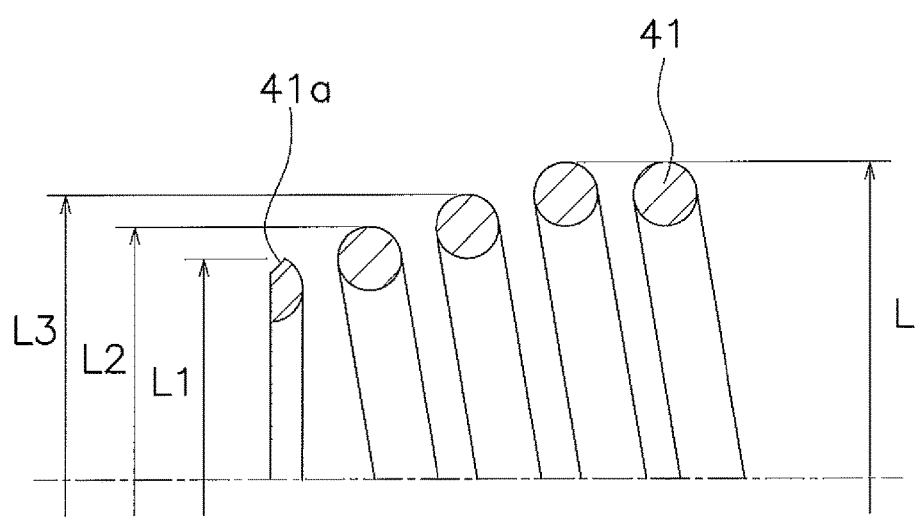
FIG. 6 is a cross-sectional view of an inner coil spring according to a fourth preferred embodiment of the present disclosure.

The fourth preferred embodiment is implemented only by changing the construction of each inner coil spring in each spring assembly according to each of the first and third preferred embodiments. As shown in FIG. 6, each inner coil spring 41 is provided with chamfered parts 41a on both end surfaces, respectively. The chamfered parts 41a are machined. Additionally, outer diameters L1 to L3 of a plurality of windings on each of the ends are smaller than an outer diameter L of the other windings, and gradually get smaller toward each of the ends.

When each inner coil spring 41 herein slides against each outer coil spring, each outer coil spring is mainly abraded by approximately three consecutive windings including the endmost winding on each of the ends of each inner coil spring 41. Based on this fact, in the fourth preferred embodiment, the outer diameters of three consecutive windings including the endmost winding on each of the ends are designed to get smaller toward each of the ends.

With the aforementioned construction, in compression and extension of each spring assembly due to torsional vibration, even when each inner coil spring 41 is moved to the outer peripheral side by a centrifugal force and slides against the inner peripheral surface of each outer coil spring, it is possible to further inhibit each inner coil spring 41 from getting stuck between windings of each outer coil spring and inhibit abrasion of each outer coil spring.

Other Preferred Embodiments

The preferred embodiments of the present disclosure have been described above. However, specific constructions are not limited to those described in the aforementioned preferred embodiments, and a variety of changes can be made without departing from the scope of the present disclosure.

What is claimed is:

1. A spring assembly for absorbing and attenuating a torsional vibration, the spring assembly comprising:
an outer coil spring; and
an inner coil spring disposed in an interior of the outer coil spring, the inner coil spring having a shorter free length than the outer coil spring, the inner coil spring chamfered on two portions of an endmost winding on both ends of the inner coil spring, the two portions opposed across a compression axis of the inner coil spring, the inner coil spring having an outer diameter set to be smaller at least at the endmost winding on each of the ends thereof than at other windings thereof.

2. The spring assembly according to claim 1, wherein the inner coil spring has a lower surface hardness than the outer coil spring.

3. A spring assembly for absorbing and attenuating a torsional vibration, the spring assembly comprising:
  an outer coil spring; and
  an inner coil spring disposed in an interior of the outer coil spring, the inner coil spring having a lower surface hardness than the outer coil spring, the inner coil spring chamfered on two portions of an endmost winding on both ends of the inner coil spring, the two portions opposed across a compression axis of the inner coil spring.

4. The spring assembly according to claim 1, wherein the outer diameter of the inner coil spring gets smaller toward each of the ends at a plurality of windings on each of the ends.

5. A lock-up device for a torque converter, the lock-up device configured to transmit a power from a front cover to an input shaft of a transmission through a torque converter body including a turbine, the lock-up device comprising:
  an input rotary member into which the power is inputted from the front cover;
  an output rotary member coupled to the turbine;
  a clutch portion mounted between the input rotary member and the output rotary member; and
  the spring assembly recited in claim 1, the spring assembly to elastically couple the input rotary member and the output rotary member in a rotational direction.

\* \* \* \* \*